Dec. 23, 1958 H. A. WAGNER ET AL 2,866,171

TUBE SOCKET

Filed June 6, 1955

INVENTORS.
Howard A. Wagner
Paul E. Anderson
By: Mason, Kolehmainen, Rathburn & Wyss
Attys United States Patent Office 2,866,171

Patented Dec. 23, 1958

2,866,171

TUBE SOCKET

Howard A. Wagner, Pittsburgh, Pa., and Paul E. Anderson, Jamestown, N. Y., assignors to Sylvania Electric Products Inc., a corporation of Massachusetts Application June 6, 1955, Serial No. 513,354

2 Claims. (Cl. 339—193)

The present invention in general relates to tube sockets, more particularly to tube sockets for use in conjunction with printed circuits, and the invention has for a principal object the provision of a new and improved tube socket enabling greater ease in the fabrication of the socket and in the fabrication of the printed circuits in which the socket is employed than has heretofore been known in the prior art.

Printed circuits of the type presently employed in commercial equipment include a chassis constructed of a self-supporting sheet of insulation on the surface of which is printed or deposited a plurality of interconnecting leads and in some instances circuit elements. It is frequently desirable to interconnect into the printed circuit certain other components such as discharge devices, transistors, transformers and other such components which may not be readily deposited or printed on the chassis. In consequence thereof, it has been found expedient to solder or braze the contact terminals of these components to the printed circuit and in the case of discharge devices or tubes to solder the contacts of a socket to the printed circuit and to insert the discharge device or tube into this socket. Since printed circuits are especially compatible with quantity production techniques, such as automatic assembly, it is another object of the present invention to provide a new and improved tube socket which is especially suitable for use with apparatus wherein such circuits are automatically fabricated.

A further object of the present invention is to provide a new and improved tube socket which may be readily secured to a printed circuit chassis and in which the contact terminals thereof may be rapidly and reliably soldered to the interconnecting printed portions of a printed circuit chassis and to other associated circuit components.

Another object of the present invention is to provide a new and improved tube socket employing contact terminals which are especially suitable for use in conjunction with automatic assembly techniques.

Still another object of the present invention is to provide a new and improved, inexpensive tube socket which may be readily molded from any suitable plastic material having high dielectric strength and good insulating qualities.

A further object of the present invention is to provide a new and improved tube socket in which the contact members thereof are separated by a relatively long surface insulation path.

Yet a further object of the present invention is to provide a new and improved tube socket which may be manufactured and assembled at a minimum cost and which provides a high voltage breakdown path between the contact members thereof.

A still further object of the present invention is to provide a new tube socket which in addition to being adapted for facile connection to a printed circuit chassis facilitates the rapid connection of other components to the printed circuits of the chassis.

Briefly, the above objects are accomplished in accordance with the present invention by the provision of a tube socket including an insulating base portion having a plurality of tube pin receiving apertures each of which open into a respective one of a plurality of deep radial grooves located in the base. A plurality of contact members are arranged, one in each groove, with a pin contact portion thereof aligned with the corresponding tube pin receiving aperture, and in insulating cover member having radially directed flanges is secured to the base with the flanges thereof depending within the grooves in the base so as to hold the contacts in place. Also, the base has peripheral flange portion provided with a plurality of apertures through which the solder terminal portions of the contact members extend so as to facilitate the connection of the contacts of the socket to the rest of the circuit by mass production techniques and to secure the socket to the chassis.

The invention both as to its organization and method of operation, together with further objects and advantages thereof, will best be understood by reference to the following detailed description, taken in connection with the accompanying drawings, in which.

Figure 1:
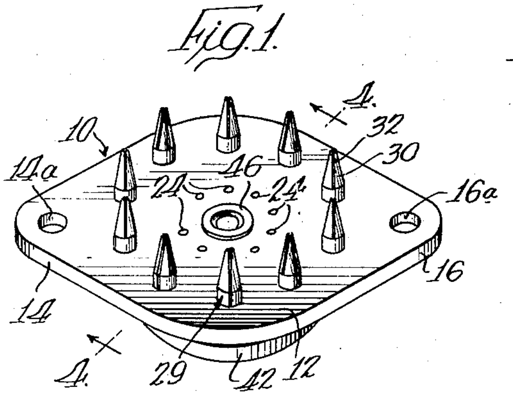
Fig. 1 is a perspective view of a tube socket embodying the present invention.
Figure 2:
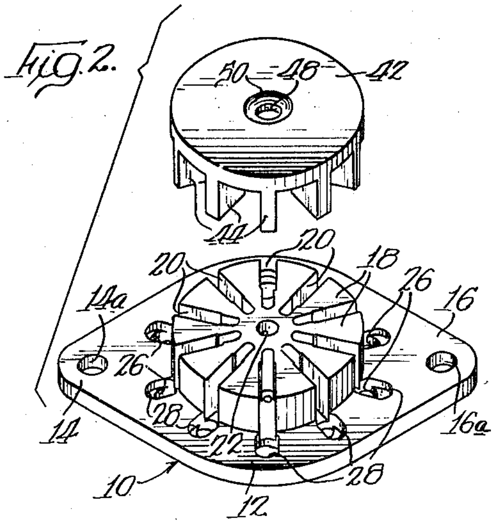
Fig. 2 is an exploded perspective view of the base and cover portions of the tube socket of Fig. 1.

Referring to the drawings, there is shown a tube socket 10 consisting of a base portion 12 having diametrically opposed outstanding ear portions 14 and 16 which are respectively provided with apertures 14*a* and 16*a* through which rivets may be inserted for suitably securing the socket 10 to a printed circuit board. The base 12 is further provided with an integral cylindrical boss portion 18 having a plurality of deep radially directed grooves 20 which extend inwardly towards but do not connect with a central aperture 22 therein which is disposed along the principal axis of the base 12. The base member 12 is further provided with a plurality of apertures 24 (Fig. 4) which are arranged about the arc of a circle concentric with the aperture 22 and are arranged and spaced to correspond with the location of the tube pins of the tubes which are to be used in conjunction with the socket 10. The apertures 24 and the radial grooves 20 are disposed in the base 12 so that the inner ends of the grooves 20 are in registry with the respective apertures 24 so that when the tube pins of the tube are inserted into the apertures 24, the pins extend into the grooves 20. The grooves 20 are wider than the width of the apertures 24, which are substantially centered therein, and the grooves 20 extend inwardly beyond the apertures 24 for purposes to be described hereinafter. At the outer extremity of the cylindrical portion 18 and in line with the respective radii thereof there is provided a plurality of apertures 26 which extend through that portion of the base member 12 which forms a pheripheral flange. There is further provided in the base member 12 a plurality of recessed portions 28 which adjoin the apertures 26 and which are arranged outwardly along the radii on which the respective apertures 26 are positioned.

Figures 3, 4, 5, 6:
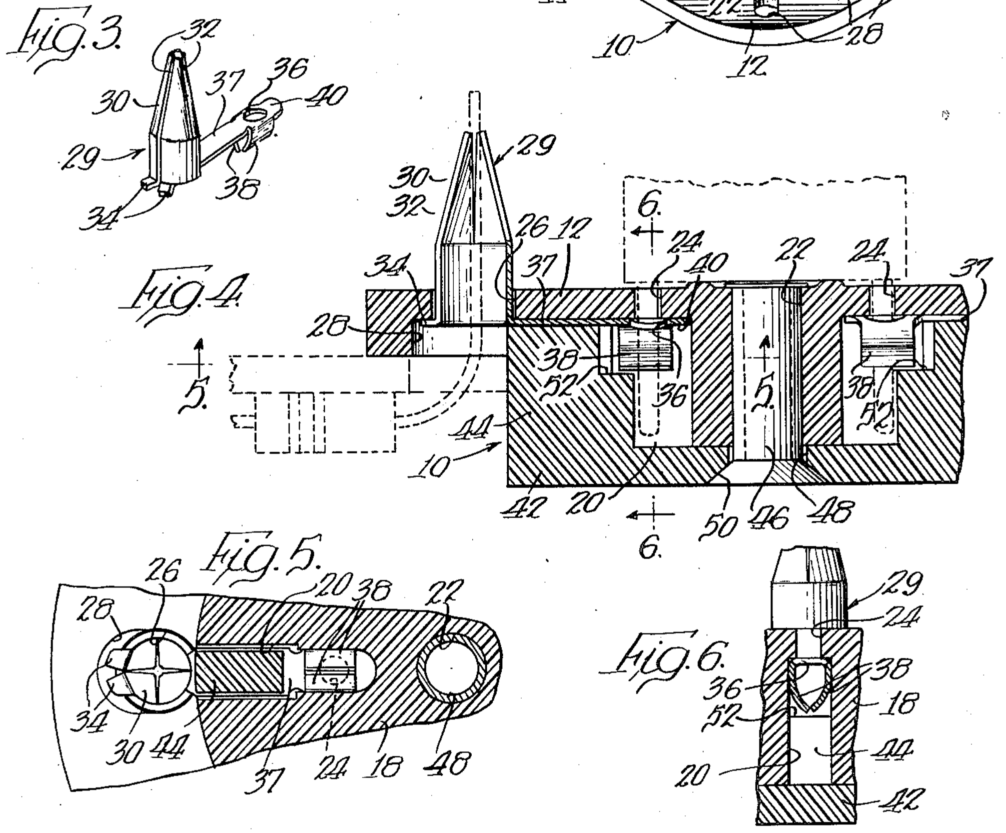
Fig. 3 is a perspective view of one of the contact members employed in the tube socket of Fig. 1.
Fig. 4 is a partial sectional view taken along the line 4—4 of Fig. 1.
Fig. 5 is a partial sectional view taken along the line 5—5 of Fig. 4.
Fig. 6 is a partial sectional view taken along the line 6—6 of Fig. 5.

A plurality of contact members 29 are respectively arranged in the grooves 20 and each includes a generally frusto conical section (best shown in Fig. 3) which is provided with a plurality of slits 32 to define a plurality of spring fingers suitable for gripping the wire lead portions of circuit components which are to be connected to the tube pins, these lead portions being inverted into the section 30 from the bottom as viewed in Fig. 3 so that one or more leads may be held in fixed position and may thereafter be soldered by a fountain or dip soldering technique. The relative positions of the printed circuit chassis and circuit components is shown in dotted lines in Fig. 4. The contact members 29 further have a pair of projecting tabs 34 at one end thereof to aid in supporting the contact in the base member 12, and are provided with a tube pin receiving and contact portion at the other end which comprises an aperture 36 and coacting resilient ears 38 arranged on opposite sides of said aperture 36 and self-biased toward one another. The contact member is further provided with a projecting tab 40 at the tube pin contact end thereof to aid in supporting the contact 29 when a tube pin is removed from the socket 10.

In assembling the tube socket 10 the contact members 29 are inserted into the base member 12 with the terminal portions 30 extending through the apertures 26 and with the apertures 36 in registration with the apertures 24 so that the intermediate portions 37 of the contacts 29 are juxtaposed with the bottoms of the respective grooves 20. The inner end of each of the grooves 20 which extend beyond the apertures 24 provides a rabbet on which the tab 40 of the contact member 29 rests. The tabs 34 are also arranged so that they extend beyond the apertures 26 and ride on the bottom of the recesses 28.

In order to secure the contact members 29 within the grooves 20, a cover member 42, having a plurality of flange portions 44 which are adapted to be received in the recesses 20, is secured to the base member 12 by any suitable means such as an eyelet type rivet 46 which extends through the aperture 22 and the aperture 48 in the cover member 42. To facilitate the peening over of the ends or the eyelet 46, the end of the aperture 48 is countersunk at 50.

The contacts 29 are rigidly secured in the recesses 20 in the base 12 by means of the radial flange portion 44 of the cover 42 which abut against the intermediate portion 37 of the contacts 29 when the cover 42 is secured in place. In order to prevent damage to the contact members 29 as tubes are inserted and removed from the socket 10 and to provide a space within the socket for the accommodation of the pin receiving and locking ears 38, a step-like recess 52 is provided at the inner end of each of the flange portions 44, so that the notch 52 extends beyond the ears 38 of the contact 29. Therefore, as the tube is inserted into the socket so that the tube pins are urged between the ears 38 of the contacts 29, the outer ends of the ears 38 abut against the edge of the notch 52 in the flange portion 44 which thus prevents undue bending of the contact member at the location where the intermediate portion 37 engages the inner end of the flange portion 44. As a tube is removed from the socket 10, the tab 40 on the contact member 29 abuts against the bottom of the groove 20 so as to provide a firm support for the contact member. It may thus be seen that the contact member 29 is held in both an up and down direction by the tube socket of the present invention without the provision of undercut portions in either of the socket parts which minimizes the cost of molding the socket components and thereby minimizes the overall manufacturing cost of the socket.

Because of the relatively large height of the boss portion 18 on the base 12, a long surface insulation path between the individual contact members is provided. Furthermore, there is no location on the socket of the present invention where moisture can collect in such manner as to decrease the surface resistance between the contact portions of the socket.

The term tube as used in this specification is intended to include any integral circuit element or elements which is provided with a number of external pins through which connection with other parts of an electric circuit is made. The term tube socket refers to a connector which is located intermediate these pins and the remainder of the electric circuit and which permits quick insertion and removal of tubes into and out of the overall circuit. For purposes of clarity, but not by way of limitation the invention has been particularly described in connection with a socket for use with an electron discharge device.

While there has been described what is at present considered to be the preferred embodiment of the invention, it will be understood that various modifications may be made therein which are within the true spirit and the scope of the invention as defined in the appended claims.

What is claimed as new and is described to be secured by Letters Patent of the United States is:

1. A tube socket, comprising a base member having a cylindrically shaped boss portion in which are provided a plurality of radial grooves in registry at each end thereof with respective ones of a plurality of apertures provided in said base member on arcs of two concentric circles, a plurality of contact members having a resilient tube pin contact portion at one end and a transverse terminal portion at the other end, said contacts being disposed in respective ones of said grooves with the contact portions thereof extending over at least a portion of one of said apertures on the smaller of said circles and with the terminal portion extending through another of said apertures on the larger of said circles, and a cover having flange portions coinciding in spacing and arrangement with said grooves, said cover portion being secured to said base with said flange portions disposed within said grooves whereby said contact members are held in place, said flanges having notches in the internal marginal edge thereof to provide undercut recesses in which the tube pin contact portions of said contact members are partially disposed.

2. A tube socket comprising an insulating base member formed to provide an upper surface and a lower surface with a downwardly extending cylindrically shaped boss on the lower surface having a plurality of radial grooves, said base member having at least two radially spaced apertures extending therethrough for each radial groove with at least one of said spaced apertures extending into the associated radial groove, a contact member having an upstanding terminal contact portion and a conducting web connected tube pin contacting portion mounted in each groove with the tube pin contacting portion aligned beneath the radial groove aperture and the upstanding terminal contact portion extending through the remaining groove associated aperture and above the upper surface of said insulating base member, and a lower cover having radially directed depending flange portions coinciding in space and arrangement with said grooves, said flange portions extending radially between the insulating base apertures associated with each groove, said cover portion being secured to said insulating base with said flange portions disposed within said grooves whereby said contact members are secured within said socket.

References Cited in the file of this patent

UNITED STATES PATENTS

| | | |
|---|---|---|
| 2,451,538 | Del Camp | Oct. 19, 1948 |
| 2,723,384 | Lang | Nov. 8, 1955 |
| 2,724,095 | Budner | Nov. 15, 1955 |
| 2,745,081 | Offerman | May 8, 1956 |